INVENTORS
DANIEL W. ROPER
EDWARD A. WILKOWSKI
DAVID P. HASS

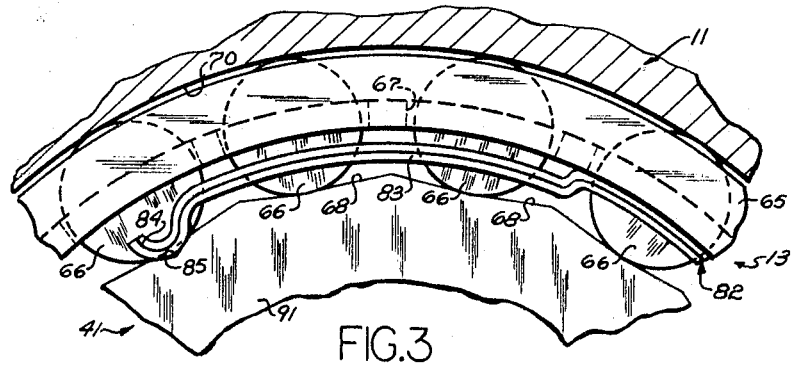
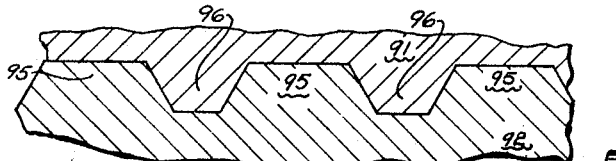
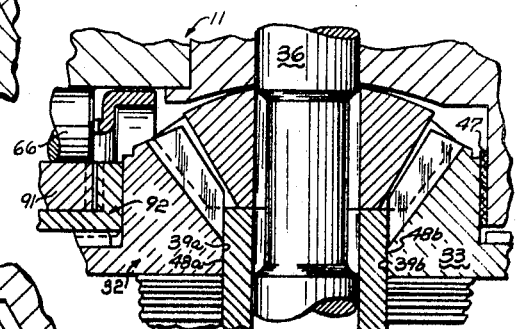
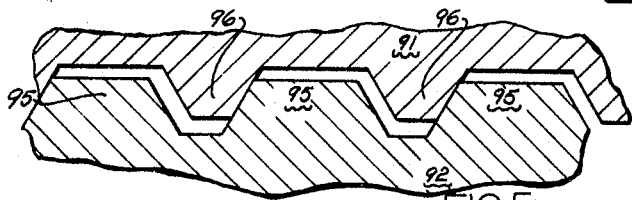
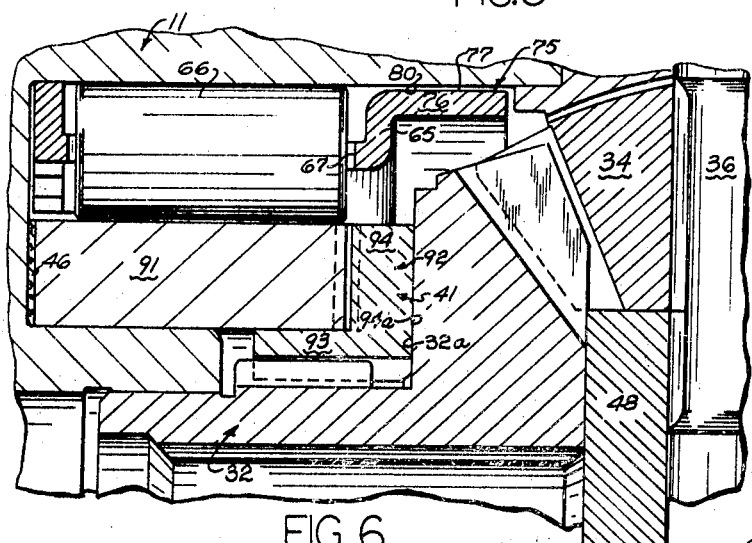
INVENTORS
DANIEL W. ROPER
EDWARD A. WILKOWSKI
DAVID P. HASS
ATTORNEYS

United States Patent Office 3,448,636
Patented June 10, 1969

3,448,636
DIFFERENTIAL THRUST MECHANISM
Daniel W. Roper, Rochester, Edward A. Wilkowski, Marshall, and David Peter Hass, Detroit, Mich., assignors to Eaton Yale & Towne Inc., Cleveland, Ohio, a corporation of Ohio
Filed May 9, 1967, Ser. No. 637,112
Int. Cl. F16h 1/44
U.S. Cl. 74—711    19 Claims

ABSTRACT OF THE DISCLOSURE

A limited slip differential drive mechanism for an automotive vehicle comprises a roller clutch arrangement to drivingly connect a differential casing to the side gear of the differential in response to a predetermined speed of relative rotation therebetween. The side gear of the differential carries a pair of cooperable parts which have axially projecting teeth in meshing engagement. One of the parts has a surface engageable with the rollers of the clutch and is moved in response to movement of the clutch to effect a driving connection of the casing and side gear. The cooperable teeth between the cooperable parts effect urging of a surface of the one part into torque transmitting engagement with the casing and also effect axial movement of the side gear into engagement with a thrust block carried by the casing. In this condition, the casing and side gear are drivingly interconnected by the clutch and the torque transmitting engagement between the casing and part, as well as between the side gear and thrust block. The cooperable parts also comprise an anti-cycling mechanism which prevents high impact collisions of the rollers of the clutch with the cooperable surfaces of the casing and the part.

---

The present invention relates to a drive mechanism, and particularly relates to a limited slip differential drive mechanism having clutch means to drivingly connect driving and driven members of a differential mechanism at a predetermined speed of relative rotation therebetween.

A known type of differential drive mechanism includes a roller clutch for drivingly connecting the casing and side gear of the differential mechanism at a predetermined relative slip speed between the casing and side gear to thereby lock up the differential. When the differential mechanism is locked up, relatively large torques are transmitted through the rollers of the roller clutch resulting in high unit pressures being applied to the rollers and the engaging surfaces thereof. Moreover, the roller clutch under certain circumstances impacts the surfaces at high velocities resulting in a reaction, or bounce back, of the clutch and causing cyclic clicking noises. One such circumstance where clutch cycling occurs is when a drive wheel of the vehicle is bounced out of frictional engagement with a rough road surface abruptly causing a high speed of relative rotation between the casing and side gear of the differential. As a result, the clutch is moved rapidly toward the engaged position and collides with the driving and driven members, the collision and high slip speed between the casing and side gear being such that the clutch may bounce back and forth between the extreme positions causing the cyclic clicking noise.

Accordingly, the principal object of the present invention is the provision of a new and improved differential drive mechanism having clutch means wherein during the lock up of the differential all of the torque is not transmitted through the clutch means and wherein the differential is subject to a minimum of cycling of the clutch means.

Another object of the present invention is the provision of a new and improved drive mechanism including driving and driven members which are drivingly connected at a predetermined speed of relative rotation therebetween by clutch means, and wherein the drive mechanism includes additional torque transmitting means operable to transmit torque between the driving and driven members when the clutch means drivingly connects the members whereby the drive is transmitted by the torque transmitting means as well as the clutch means when the driving and driven members are drivingly interconnected, thereby insuring positive lock-up of the drive mechanism.

A further object of the present invention is the provision of a new and improved drive mechanism including driving and driven members which are drivingly connected at a predetermined speed by clutch means and which includes means for limiting cycling of the clutch means by dissipating the kinetic energy of the clutch means when the clutch means is moved to connect the members and thus minimize the magnitude of the collision between the clutch means and the surfaces that it engages.

A still further object of the present invention is the provision of a new and improved drive mechanism including driving and driven members which are drivingly connected by clutch means at a predetermined speed of relative rotation therebetween and wherein the driven member carries a pair of parts having interengaging teeth and wherein one of the parts moves relative to the other part upon engagement of the clutch means and as a result of this movement, the cooperating teeth effect an axial separation of the parts to move parts of the mechanism into torque transmitting engagement.

Another object of the present invention is the provision of a new and improved drive mechanism, as noted in the preceding paragraph, wherein a surface of one of the parts is forced into torque transmitting engagement with a surface of the driving member when the parts are moved axially apart.

Still another object of the present invention is the provision of a new and improved differential mechanism having clutch means which drivingly connects a differential casing and a side gear of the differential, and wherein the side gear is associated with a pair of parts which cooperate to effect axial movement of the side gear upon engagement of the clutch means, and wherein the side gear upon axial movement engages a thrust block, which is connected with the differential casing, in a torque transmitting relation to effect the transmission of torque between the side gear and casing.

Other objects and advantages of the present invention will become apparent from the following detailed description of a preferred embodiment of the present invention made with reference to the accompanying drawings and wherein:

FIG. 3 is a sectional view taken approximately at the line 3—3 of FIG. 1;

FIG. 4 is a fragmentary view taken approximately at the line 4—4 of FIG. 2;

FIG. 5 is a fragmentary view like FIG. 4 but with the parts thereof shown in a different operative position;

FIG. 6 is a view similar to FIG. 2 with parts thereof shown in a different operative position; and FIG. 7 is a fragmentary view of a portion of the differential mechanism of FIG. 1 shown on an enlarged scale and in a different operative position.

The present invention provides an improved dicerential drive mechanism of the limited slip type wherein driving and driven members of the differential are securely locked together by operation of speed responsive clutch means at a predetermined speed of relative rotation between the driving and driven members. The differential is constructed to insure positive lockup of the differential as well as minimizing cyclic engagement and disengagement of the clutch means.

Figure 1:
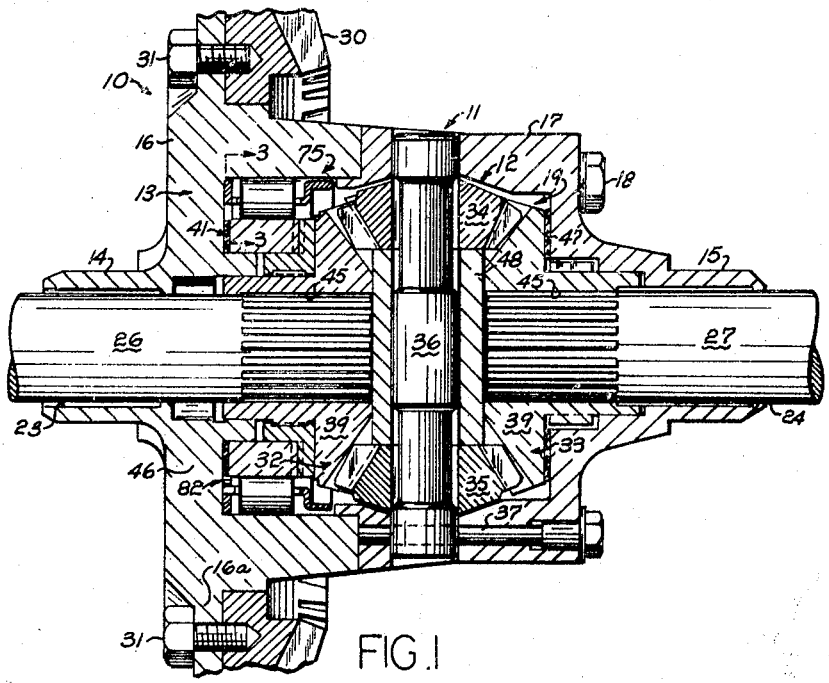
FIG. 1 is a sectional view of a differential mechanism embodying the present invention.

As representing a preferred embodiment of the present invention, a differential drive mechanism 10 is illustrated in FIG. 1 and which is especially suitable for use in driving ground-engaging traction wheels of an automotive vehicle. The differential drive mechanism 10 comprises, in general, a rotatable planet gear carrier 11, a differential gear train 12, and a clutch means 13 operable to retard rotation of one of the gears of the gear train 12 relative to the planet gear carrier 11.

The planet gear carrier 11 includes a pair of support portions 14, 15 adapted to be received in bearings of a supporting structure, such as an axle housing, not shown, by which the carrier 11 is rotatably supported. The carrier 11 further includes a pair of members 16 and 17 which are suitably secured together by screws 18 (only one of which is illustrated), and which define a gear chamber 19 in which the gear train 12 and the clutch means 13 are located. The support portions 14, 15 of the planet gear carrier 11 are formed on opposite ends of the members 16, 17, respectively, and are provided with axial openings 23, 24, respectively, extending therethrough. The openings 23, 24 are disposed in an aligned relation on a common axis which is also the rotational axis of the carrier 11. The axial openings 23, 24 communicate with the chamber 19 and receive or accommodate the driven or power output means as represented by axle shafts 26, 27, respectively, whose outer end portions are connected with the traction wheels, or the like, not shown, and whose inner, or adjacent, end portions are connected with the gear train 12, as is described presently.

The differential mechanism 10 includes a conventional ring gear 30 extending around and mounted on the carrier 11 by means of connecting screws 31 which extend through a flange portion 16a of the planet carrier 11. A suitable drive pinion, not shown, meshes with the ring gear 30 and represents the power input means for the differential mechanism 10 and upon rotation effects rotation of the ring gear 30 to rotate the planet carrier 11.

The gear train 12 is operable to transmit the rotary motion of the planet carrier 11 to the output shafts 26, 27. The gear train 12 comprises a pair of beveled side gears 32, 33 and a group of beveled pinion planetary gears 34, 35 disposed between and in meshed engagement with the side gears 32, 33 for drivingly connecting the latter. The planetary gears 34, 35 are rotatably supported by the carrier 11 by means of a pinion shaft 36 extending across the gear chamber 19 and secured in the carrier 11 by a suitable anchor pin 37 extending through the pinion shaft transversely thereof.

The side gears 32, 33 and the pinion gears 34, 35 are, in the preferred embodiment, all bevel gears of conventional form as far as the teeth thereof are concerned, and the tooth profiles are of a conventional shape having pressure angle values coming within the usual range of such values. The side gears 32, 33, while in the preferred embodiment, comprise bevel gears, may take other known forms and each of the gears 32, 33 comprises an annular body 39 having teeth formed thereon and a central hollow sleeve connected with the body and extending coaxially with the axis of rotation of the side gears 32, 33. The side gears 32, 33 are provided with splines 45 in the central openings thereof which are engaged by corresponding splines formed on the inner ends of the axle shafts 26, 27, respectively, for drivingly connecting the shafts 26, 27 and the side gears 32, 33.

Figure 2:
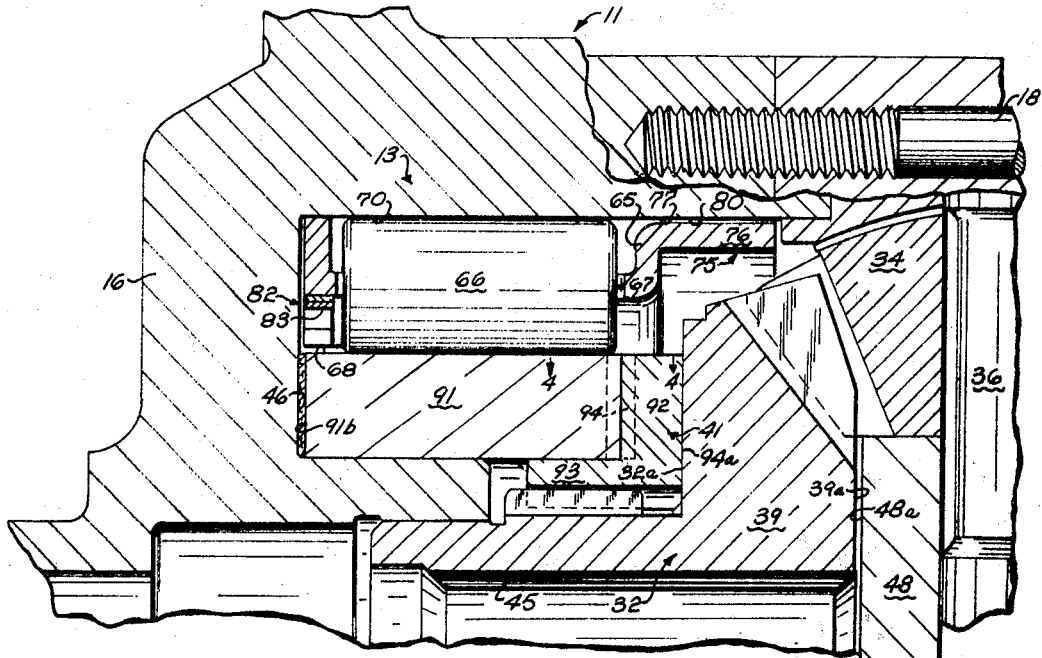
FIG. 2 is a fragmentary sectional view of a portion of the differential mechanism of FIG. 1 and shown on an enlarged scale.

The pinion shaft 36 is surrounded by a thrust block 48 having a circular opening therethrough for reception of the pinion shaft 36. The thrust block 48 is fixedly secured to the pinion shaft 36 between the pinion gears 34, 35 and includes surface portions 48a, 48b which are in an axial facing relation with annular surface portions 39a, 39b of the side gears 32, 33, respectively (see FIG. 7). When the differential mechanism 10 is operating to transmit torque from the carrier 11 substantially equally to the axles 26, 27, there is a slight clearance between the surfaces 39a, 39b of the side gears 32, 33 and the thrust surfaces 48a, 48b of the thrust block 48, as is clearly illustrated in FIGS. 1 and 2. The clearance referred to is exaggerated in the drawing for the purposes of illustration and, in practice, may be in the neighborhood of approximately 0.001 inch.

The clutch means 13 is a double overrunning clutch operable to retard relative rotation between the side gear 32 and the planet carrier 11 and, more specifically, the clutch means 13 drivingly locks or interconnects the planet carrier 11 and side gear 32. The clutch means 13 is positioned between the planet carrier 11 and the side gear 32 and includes a shiftable roller cage, or carrier 65 and a plurality of rollers 66, supported in openings 67 in the shiftable roller cage 65. The openings 67 are dimensioned so as to permit the rollers 66 to be freely rotatable and radially shiftable relative to the cage 65, and yet prevent circumferential movement of the rollers relative thereto.

The clutch means 13 cooperates with an assembly 41 which is drivingly connected to the side gear 32. The assembly 41 is provided with a plurality of V-shaped grooves 68 which are circumferentially spaced around the outer periphery thereof and correspond in number to the number of rollers 66. The rollers 66 engage sides of the V-shaped grooves 68 on the assembly 41 so that shifting movement of the roller cage 65 simultaneously moves the rollers 66 circumferentially relative to the assembly 41 to cam the rollers 66 generally radially outwardly.

The roller cage 65 is shiftable or movable, as noted above, from a position shown in FIG. 3, wherein the rollers 66 permit relative rotation between the side gear 32 and the planet carrier 11, to a position wherein the rollers 66 are wedgingly engaged between side surfaces of the grooves 68 and a cylindrical surface 70 forming the inner periphery of the carrier 11 to drivingly connect the carrier 11 and the side gear 32 together and thereby lock up the differential mechanism 10 in a manner which is described in detail hereinafter.

The clutch means 13 is associated with actuating means 75 for moving the rollers 66 to their engaged positions between the surfaces of the V-groove 68 and the surface 70 of the carrier 11 in response to a predetermined speed of relative rotation between the carrier 11 and the side gear 32 and which actuating means 75 comprises a viscous coupling mechanism. The viscous coupling mechanism comprises an annular flange portion 76 of the cage 65 which extends generally axially of the side gear 32 and away from the rollers 66 and which has an annular outer periphery 77 which lies adjacent an annular surface 80 formed on the interior of the planet carrier 11. The surfaces 77, 80 form a viscous shear space therebetween in which a viscous shear fluid is located and which functions as a drive connection between the carrier 11 and the cage 65.

Upon a predetermined speed of relative rotation between the planet carrier 11 and the side gear 32, the driving force provided by the shear fluid of the viscous coupling 75 effects a circumferential shifting movement of the cage 65 relative to the side gear 32 so that the clutch means 13 drivingly connects the carrier 11 and the side gear 32. More specifically, the shifting force provided by the viscous coupling 75 effects movement of the roller cage 65 and the rollers 66, carried thereby, into driving engagement between the surfaces of the grooves 68 and the surface 70 of the carrier 11.

A biasing means in the form of a spring means 82 is provided to urge the rollers 66 and roller cage 65 to the disengaged positions. The spring means 82 may be of any suitable construction, and preferably comprises a pair of spring members 83 (only one of which is illustrated in FIG. 3). Bowed end portions 84 of the springs 83 cooperate with suitably formed grooves or notches 85 in the assembly 41 so that the rollers 66 are held in a disengaged position during normal operation of the vehicle. If a driving wheel of the vehicle should slip, the rollers 66 are urged toward an engaged position against the bias of the springs 83 provided by a camming action between the bowed end portions 84 of the springs and the notches 85. A more complete description of the mode of operation of the spring means 82 is contained in copending U.S. application Ser. No. 609,932, assigned to the assignee of the present application, and to which reference is hereby made.

In accordance with the present invention means are provided for locking the carrier 11 and side gears 32, 33 together through relatively large torque transmitting surface areas when the clutch means 13 is moved to the engaged position. In this connection, the differential 10 includes a torque transmitting means, in addition to the clutch means 13, for transmitting torque from the carrier 11 to the side gear 32 when the differential 10 is locked up. In the preferred embodiment, the additional torque transmitting means is formed by the assembly 41. The assembly 41 includes a pair of annular members 91, 92. The member 92 is a cylindrical ring-like member splined to the hub of the side gear 32. The member 92 includes a sleeve-like portion 93 extending along the hub of the side gear 32 having splined teeth on the inner periphery thereof cooperating with splined teeth on the hub of the side gear 32, and the outer periphery slidingly supports the inner periphery of the member 91. The member 91 extends axially of the member 92 and is located inwardly of the clutch means 13. The grooves 68 are formed in the outer periphery of the member 91. The left end portion of the member 91, as viewed in FIG. 2, engages a thrust bearing 46 carried by the carrier 11.

The member 92 includes a radially extending flange portion 94 at the right end thereof, as viewed in the drawing. The flange portion 94 has an annular surface 94a engaged with an annular surface 32a of the side gear 32 so that the flange portion 94 and the member 91 are located snugly between the annular surface 32a of the side gear 32 and the thrust bearing 46 in the position shown in FIGS. 1 and 2. The flange portion 94 and the end of the member 91 engaged therewith have cooperating cam surfaces formed thereon which, in the preferred embodiment, take the form of tooth-like projections 95, 96, respectively, having tapered or slanted sides and which are in meshing engagement (see FIGS. 4 and 5). During normal operation of the differential mechanism 10, that is to say, when the wheels of the vehicle are being driven with substantially equal amounts of torque, the projections 95, 96 are in mesh and the members 91, 92 are carried as a unit with the side gear 32. The relationship between the projections 95, 96 during normal operation of the mechanism 10 is illustrated in FIG. 4.

When one drive wheel of the vehicle begins to slip, the differential mechanism 10 operates to establish relative rotation between the carrier 11 and the side gears 32, 33. When a predetermined speed of the relative rotation exists between the carrier 11 and the side gears 32, 33, the actuating means 75 shifts the roller cage 65, as described previously, and moves the rollers 66 into driving engagement between the surface 70 of the carrier 11 and the inclined sides of the grooves 68. The member 91 is thus driven by the carrier 11 through the clutch means 13 relative to the annular member 92. The teeth on the member 91 are thereby moved circumferentially relative to the teeth on the member 92 and the members 91, 92 are accordingly cammed axially away from each other by the wedging action between the engaged slanting surfaces of the teeth 95, 96 to a position such as is shown in FIG. 5. It is apparent that the drive from the carrier to the member 91 through the rollers 66 is also transmitted to the side gear 32 as the members 91, 92 are urged axially of each other.

When the members 91, 92 are urged relatively axially apart, an annular end surface 91b of the member 91 is urged into torque transmitting engagement with the thrust bearing 46. The force of this engagement is greater than under a no-slip condition of the differential 10 and provides a relatively large torque transmitting area of frictional engagement between the end 91b of the member 91 and the thrust washer 46. Additionally, the axial separation of the members 91, 92 results in the member 92 being urged toward the right, as viewed in the drawing, with the axial force being transmitted to the side gear 32 through the surfaces 32a, 94a so that the surface 39a of the side gear 32 moves into torque transmitting engagement with the facing thrust surface 48a of the thrust block 48. It will be appreciated that since the shaft 36 is secured in the carrier 11, engagement of the surface 39a of the side gear 32 and the surface 48a of the thrust block 48 produces an additional torque transmitting area of frictional engagement from the carrier 11 to the axle 26 through the side gear 32. The relationship between the parts of the mechanism when the members 91, 92 are moved axially apart is illustrated in FIG. 6.

As illustrated in FIG. 7, the force exerted upon the thrust block 48 by the side gear 32 is effective to urge the thrust block 48 toward the right so as to provide pressure engagement between the surface 39b of the side gear 33 and the facing surface 48b of the thrust block 48, see FIG. 7. The reaction force transmitted through the thrust block 48 urges the body of the side gear 33 firmly against a thrust washer 47.

It is apparent that a differential mechanism constructed as described provides spaced torque transmitting areas in frictional engagement between the carrier 11 and the side gear 32 in addition to the clutch means 13. These additional torque transmitting surfaces between the driving and driven members are effective to prolong the lift of the clutch means 13 resulting in increased durability of the differential mechanism 10 and insure a rigid lock-up of the differential.

The clutch means 13 is disengaged by action of the spring means 82, referred to above. When the clutch 13 is returned to the disengaged position, the teeth of the members 91, 92 are returned to the meshed relationship illustrated in FIG. 4, due to the gear tooth reaction forces exerted upon the side gear 32 by the gears 34, 35 as referred to previously. It should be appreciated that when the members 91, 92 are returned to their position illustrated in FIG. 4, the clearance between the side gears 32, 33 and the thrust block 48 is restored to the normal dimension.

Under certain circumstances, previously known differential mechanisms of the limited slip type have been subjected to cyclic locking and unlocking of the driving and driven members resulting in an undesired clicking noise, and undue wearing of the clutch means. An example of such an instance is when the vehicle is being driven on an extremely rough road surface at speeds which are sufficiently high to cause bouncing of one of the drive wheels of the vehicle out of engagement with the road surface. It is apparent that under such a condition, the wheel out of engagement with the road will suddenly tend to be driven at a high rotational speed relative to the speed of rotation of the wheel which is in engagement with the road, and the relative speed of rotation between the carrier 11 and the side gear 32 is abruptly increased well above the predetermined relative speed necessary to actuate the clutch means 13 to the engaged position between the side gear 32 and the carrier 11. In previously known differential mechanisms of the type referred to, and under the conditions described, the clutch means 13 is abruptly accelerated toward the engaged position due to the high relative speed between the carrier 11 and the side gear 32 causing the rollers 66 of the clutch means 13 to strike the drive surfaces with which they engage at high velocity and elastically bounce back. It is believed that in some cases the rollers 66 are bounced circumferentially back to the engaged positions on the opposite sides of the grooves 68, undergoing another collision, and are again driven toward the first-mentioned engaged position. The result of this cycling of the rollers 66 is a cyclic clicking noise as the rollers 66 of the clutch means 13 repeatedly strike surfaces at a high velocity. Additionally, undue wearing of the differential mechanism 10 results.

A differential mechanism constructed in accordance with the present invention includes means for limiting the aforementioned cyclic engaging and disengaging action of the clutch means 13. In the present embodiment, the means for limiting the cycling of the clutch means 13 operates to dissipate or absorb the kinetic energy of the roller cage 65 and rollers 66 as they are initially driven into their engaged positions by the actuation means 75 under circumstances such as those referred to above. In the preferred embodiment, the means for dissipating or absorbing the kinetic energy of the rollers 66 and roller cage 65 is provided by the members 91, 92.

Assuming that the vehicle is being driven over a rough surface and the ground-engaging wheel associated with the axle 26 is bounced out of frictional engagement with the road surface while the ground-engaging wheel associated with the axle 27 remains in frictional engagement with the ground, the side gear 32 is abruptly driven at a speed in excess of the speed of rotation of the carrier 11 resulting in relative rotation between the carrier 11 and side gear 32. If the speed of relative rotation between the carrier 11 and the side gear 32 is well above the relative speed therebetween which is necessary to engage the clutch means 13, the rollers 66 and the roller cage 65 are abruptly accelerated toward the engaged position. As the rollers 66 strike the surfaces of the grooves 68 and the surface 70, the force of the impact between the rollers 66 and the surfaces is effective to cause rotation of the member 91 relative to the member 92, which movement dissipates a portion of the kinetic energy of the rollers 66 and the roller cage 65 and has the effect of reducing the magnitude of the collision between the individual rollers 66 and the surfaces which they strike. Moreover, the friction loss as a result of the meshing teeth on the members 91, 92 also provide for dissipation of the kinetic energy of the clutch means 13. In effect, the differential mechanism 10 illustrated in the drawing, provides surfaces of the grooves 68 which are capable of "giving" as the rollers 66 are moved at relatively high velocity into engagement therewith and the rollers 66, accordingly, are not elastically bounced out of the engaged positions, but continue to be urged into the engaged positions to drivingly connect the carrier and side gear in substantially the same manner as would occur if the speed of the relative rotation between the carrier 11 and side gear 32 would gradually change.

It should be appreciated that the "giving" of the engaging surfaces in response to abrupt movement of the roller cage 65 and rollers 66 into an engaged position is provided by the camming action between the member 91 and the member 92, as described above. When the clutch means 13 is engaged, the parts of the differential mechanism 10 cooperate in a manner described above in reference to normal locking of the differential mechanism.

It can now be seen that a new and improved differential drive mechanism of the limited slip type has been provided wherein members of the differential mechanism are moved into frictional engagement in response to locking up the mechanism so as to provide a relatively large torque transmitting area of engagement between parts of the driving and driven members when the mechanism is locked. It is also apparent that an improved locking type drive mechanism has been provided wherein the cyclic engaging and disengaging of a roller clutch means of the drive is prevented, and in the preferred embodiment, means are provided for dissipating or absorbing kinetic energy of the clutch means as it is abruptly actuated to its engaged position.

While a single embodiment of the present invention has been illustrated and described herein in considerable detail, the present invention is not to be considered to be limited to the precise construction shown. It is our intention to cover hereby all adaptations, modifications, and uses of the present invention which come within the scope of the appended claims.

Having described our invention, we claim:

1. A drive mechanism including a driving member and a driven member, clutch means located between said members and operable between a first condition wherein said members are capable of rotating relative to each other and a second condition wherein relative rotation between said members is retarded by said clutch means, actuating means for operating said clutch means to said second condition in response to a predetermined speed of relative rotation between said members, and torque transmitting means operable in response to operation of said clutch means to the second condition to transmit torque between said members to enable torque to be transmitted between said members through said torque transmitting means independently of said clutch means when said clutch means is in the second condition.

2. A drive mechanism as defined in claim 1 wherein said torque transmitting means includes a part carried by one of said members, said part being moved relative to said one member by said clutch means when said clutch means is operated to the second condition, and cam means cooperable with said part and operable to effect axial movement of said part into torque transmitting pressure engagement with the other of said members upon said movement.

3. A drive mechanism as set forth in claim 1 wherein said torque transmitting means is operative to dissipate kinetic energy resulting from abrupt operation of said clutch means to said second condition to thereby minimize cycling of said clutch means between said first and second conditions.

4. A drive mechanism including a driving member and a driven member, clutch means located between said members and operable between a first condition wherein said members are capable of rotating relative to each other and a second condition wherein relative rotation between said members is retarded by said clutch means, actuating means for operating said clutch means to said second condition in response to a predetermined speed of relative rotation between said members, and torque transmitting means operable in response to operation of said clutch means to the second condition to transmit torque between said members to enable torque to be transmitted between said members through said torque transmitting means and said clutch means when said clutch means is in the second condition, said driving member comprises a casing of a differential and said driven member comprises a side gear of said differential, and said torque transmitting means includes a first part moved by said clutch means when said clutch means is operated to the second condition, a second part cooperable with said first part upon movement thereof by said clutch means to effect movement of said first part generally axially of said side gear to urge a surface of said first part into torque transmitting pressure engagement with said casing.

5. A drive mechanism as defined in claim 4 wherein the movement of said first part by said clutch means dissipates the kinetic energy of said clutch means and thereby minimizes cycling of said clutch means.

6. A drive mechanism as defined in claim 4 wherein said first and second parts comprise annular members having tooth-like projections extending axially thereof in meshing engagement, said tooth-like projections having slanted side surfaces cooperable to urge said first part axially into torque transmitting pressure engagement with said casing.

7. A drive mechanism as defined in claim 6 further including means supporting said side gear for axial movement with said second part being carried by said side gear, said second part and said side gear being movable axially upon movement of said first part by said clutch means, and said torque transmitting means further includes a thrust block rotatable with said casing and having a surface engageable with said side gear upon axial movement of said side gear.

8. A drive mechanism including a driving member and a driven member, clutch means disposed between said members movable from a first position wherein said driving and driven members are capable of rotation relative to each other and a second position wherein portions of said clutch means engage portions of said driving and driven members to drivingly connect said members, actuating means for moving said clutch means between said first and second positions at a predetermined speed of relative rotation between said members, and means for minimizing cyclical movement of the clutch means between the first and second conditions due to a rebounding of said clutch means upon engagement of said portions of said clutch means with said portions of said driving and driven members.

9. A drive mechanism including a driving member and a driven member, clutch means disposed between said members movable from a first position wherein said driving and driven members are capable of rotation relative to each other and a second position wherein portions of said clutch means engage portions of said driving and driven members to drivingly connect said members, actuating means for moving said clutch means between said first and second positions at a predetermined speed of relative rotation between said members, and means for limiting movement of said clutch means to minimize cyclic engagement of said portions of said clutch means with said portions of said driving and driven members, said means for limiting cycling of said clutch means comprising means for limiting elastic collisions of said portions of said clutch means with said portions of said driving and driven members.

10. A drive mechanism including a driving member and a driven member, clutch means disposed between said members movable from a first position wherein said driving and driven members are capable of rotation relative to each other and a second position wherein portions of said clutch means engage portions of said driving and driven members to drivingly connect said members, actuating means for moving said clutch means between said first and second positions at a predetermined speed of relative rotation between said members, and means for limiting movement of said clutch means to minimize cyclic engagement of said portions of said clutch means with said portions of said driving and driven members, said means for limiting movement of the clutch means comprising cooperable parts effective to dissipate the kinetic energy of said clutch means as it moves to the second position.

11. A drive mechanism as defined in claim 10 wherein said cooperable parts comprise first and second parts carried by said driven member, said first part having a surface portion engageable by said clutch means and said first part being movable circumferentially relative to said second part upon engagement thereof by said clutch means.

12. A drive mechanism comprising rotatable power input means, first and second driven output means, differential gear means for driving said first and second driven output means from said input means and providing a differential action between said first and second driven output means, said differential gear means including first and second differential side gears drivingly connected to said first and second driven output means, respectively, to effect rotation of said first and second driven output means upon rotation of said side gears, a rotatable planet gear carrier drivingly connected with said input means, at least one planetary gear rotatably mounted on said planet gear carrier in meshing engagement with said side gears to drive the same, clutch means operatively associated between said input means and one of said output means respectively, said clutch means being operable between a first condition wherein said planet gear carrier and one of said side gears are drivingly connected and a second condition permitting relative rotation between said planet gear carrier and said one side gear, actuating means for operating said clutch means from the second condition to the first condition at speeds of relative rotation between said input means and one of said first and second output means above a predetermined speed, and means for preventing cyclic operation of said clutch means to the first condition when the speed of relative rotation between said input and output means is abruptly increased to a speed in excess of said predetermined speed.

13. A drive mechanism as defined in claim 12 wherein said clutch means includes a plurality of parts circumferentially movable into engagement with spaced surfaces associated with said input means and one of said output means when said clutch means is operated to the first condition, and said means for preventing cyclic operation comprises means for preventing elastic collisions between said parts of said clutch means and said surfaces.

14. A drive mechanism as defined in claim 12 including means for effecting torque transmitting engagement between surfaces of said side gears and surfaces associated with said input means in response to operation of said clutch means to the first condition, with torque being transmitted between said input and said output means by said torque transmitting surfaces and said clutch means.

15. A drive mechanism including a driving member and a driven member, clutch means located between said members and operable between a first condition wherein said members are capable of rotating relative to each other and a second condition wherein relative rotation between said members is retarded by said clutch means, actuating means for operating said clutch means to said second condition in response to a predetermined speed of relative rotation between said members, and torque transmitting means operable in response to operation of said clutch means to the second condition to transmit torque between said members to enable torque to be transmitted between said members through said torque transmitting means and said clutch means when said clutch means is in the second condition, said driving member comprises a casing of a differential mechanism and said driven member comprises a side gear of said differential mechanism and including means mounting said side gear for axial movement relative to said casing, said torque transmitting means including means for moving said side gear generally axially upon operation of said clutch means to the second condition and a thrust block carried by said casing and having a thrust surface against which said side gear is urged and through which torque is transmitted between said casing and said side gear.

16. A drive mechanism including a driving member and a driven member, clutch means located between said members and operable between a first condition wherein said members are capable of rotating relative to each other and a second condition wherein relative rotation between said members is retarded by said clutch means, actuating means for operating said clutch means to said second condition in response to a predetermined speed of relative rotation between said members, and torque transmitting means operable in response to operation of said clutch means to the second condition to transmit torque between said members to enable torque to be transmitted between said members through said torque transmitting means and said clutch means when said clutch means is in the second condition, said torque transmitting means including a part carried by one of said members, said part being movable in one direction relative to said one member by said clutch means when said clutch means is operated to the second condition, and cam means cooperable with said part and operable to effect movement of said part in another direction and into torque transmitting pressure engagement with the other of said members upon movement of said part in said one direction.

17. A drive mechanism including a driving member and a driven member, clutch means located between said members and operable between a first condition wherein said members are capable of rotating relative to each other and a second condition wherein relative rotation between said members is retarded by said clutch means, actuating means for operating said clutch means to said second condition in response to a predetermined speed of relative rotation between said members, and torque transmitting means for transmitting torque directly from said driving member to said driven member and for transmitting torque from said clutch means to said driven member.

18. A drive mechanism comprising rotatable power input means, first and second driven output means, differential gear means for driving said first and second driven output means from said input means and providing a differential action between said first and second driven output means, said differential gear means including first and second differential side gears drivingly connected to said first and second driven output means, respectively, to effect rotation of said first and second driven output means upon rotation of said side gears, a rotatable planet gear carrier drivingly connected with said input means, at least one planetary gear rotatably mounted on said planet gear carrier in meshing engagement with said side gears to drive the same, clutch means operatively associated between said input means and one of said output means respectively, said clutch means being operable between a first condition wherein said planet gear carrier and one of said side gears are capable of rotating relative to each other and a second condition wherein relative rotation between said planet gear carrier and said one side gear is retarded by said clutch means, actuating means for operating said clutch means to the second condition at a predetermined speed of relative rotation between said input means and one of said first and second output means, and torque transmitting means operable in response to operation of said clutch means to said second condition to enable torque to be transmitted between said planet gear carrier and said one side gear through said torque transmitting means and independently of said clutch means when said clutch means is in said second condition.

19. A drive mechanism as set forth in claim 18 wherein said torque transmitting means is operative to dissipate kinetic energy resulting from abrupt operation of said clutch means to said second condition to thereby minimize cycling of said clutch means between said first and second conditions.

References Cited
UNITED STATES PATENTS

| | | | |
|---|---|---|---|
| 3,198,035 | 8/1965 | Mueller | 74—711 X |
| 3,202,466 | 8/1965 | Kaptur | 74—713 X |
| 3,324,744 | 6/1967 | Roper | 74—711 |

ARTHUR T. McKEON, *Primary Examiner.*

U.S. Cl. X.R.

192—45